(12) United States Patent
Morris et al.

(10) Patent No.: US 8,886,614 B2
(45) Date of Patent: Nov. 11, 2014

(54) EXECUTING A JOIN PLAN USING DATA COMPRESSION

(75) Inventors: John Mark Morris, San Diego, CA (US); Todd A Walter, Mississauga (CA)

(73) Assignee: Teradata US, Inc., Dayton, OH (US)

( * ) Notice: Subject to any disclaimer, the term of this patent is extended or adjusted under 35 U.S.C. 154(b) by 2050 days.

(21) Appl. No.: 11/563,280

(22) Filed: Nov. 27, 2006

(65) Prior Publication Data

US 2007/0136346 A1 Jun. 14, 2007

Related U.S. Application Data

(63) Continuation-in-part of application No. 10/770,796, filed on Feb. 3, 2004, now Pat. No. 7,383,270.

(60) Provisional application No. 60/741,428, filed on Dec. 1, 2005.

(51) Int. Cl.
*G06F 17/00* (2006.01)

(52) U.S. Cl.
USPC .......................................................... 707/693

(58) Field of Classification Search
USPC ............... 707/2, 101, 616, 692, 693, 999.101
See application file for complete search history.

(56) References Cited

U.S. PATENT DOCUMENTS

| | | | | |
|---|---|---|---|---|
| 5,864,842 A * | 1/1999 | Pederson et al. | .................. | 707/3 |
| 6,226,628 B1 * | 5/2001 | Forbes | .............. | 707/1 |
| 6,341,281 B1 * | 1/2002 | MacNicol et al. | ............... | 707/3 |
| 6,505,188 B1 * | 1/2003 | Ghazal et al. | .......................... | 1/1 |
| 6,745,173 B1 * | 6/2004 | Amundsen | ........................ | 707/2 |
| 7,024,414 B2 * | 4/2006 | Sah et al. | ....................... | 707/101 |
| 7,054,852 B1 * | 5/2006 | Cohen | ................ | 707/2 |
| 7,234,112 B1 * | 6/2007 | Brown et al. | ................. | 715/713 |
| 7,383,270 B1 * | 6/2008 | Kostamaa et al. | ............. | 707/101 |
| 2004/0181514 A1 * | 9/2004 | Santosuosso | ...................... | 707/3 |
| 2005/0138024 A1 * | 6/2005 | Doerre et al. | ..................... | 707/4 |
| 2005/0192996 A1 * | 9/2005 | Tarin | .............................. | 707/102 |
| 2007/0073759 A1 * | 3/2007 | El-Sabbagh | ................... | 707/102 |
| 2008/0294676 A1 * | 11/2008 | Faerber et al. | ................ | 707/102 |

* cited by examiner

*Primary Examiner* — Mohammed R Uddin
(74) *Attorney, Agent, or Firm* — James Stover

(57) ABSTRACT

A join plan creates an intermediate table from two or more database tables within a database. In doing so, at least one projected and compressible column within one of the database tables is identified, where the column contains data values to which the application of a compression data transformation results in a reduction in the size of the data values. The frequency of occurrences of at least some unique values in the compressible column is identified, and then the two or more database tables are joined. The results of the join are then stored in the intermediate table such that the compression data transformation is applied to at least some of the unique values in the compressible column for which the frequency has been identified.

12 Claims, 6 Drawing Sheets

EXECUTING A JOIN PLAN USING DATA COMPRESSION

CROSS REFERENCE TO RELATED APPLICATIONS

This application claims priority under 35 U.S.C. §119(e) to Provisional Patent Application Ser. No. 60/741,428, entitled "EXECUTING A JOIN PLAN USING DATA COMPRESSION," filed on Dec. 1, 2005, by John Mark Morris and Todd A. Walter.

BACKGROUND

Computer systems generally include one or more processors interfaced to a temporary data storage device such as a memory device and one or more persistent data storage devices such as disk drives. Each disk drive generally has an associated disk controller. Data is transferred from the disk drives to the disk controller and is then transferred to the memory device over a communication bus or similar. Once data has been transferred from the disk drives to a memory device accessible by a processor, database software is able to examine the data to determine if it satisfies the conditions of a query.

In data mining and decision support applications, it is often necessary to scan large amounts of data to include or exclude relational data in an answer set. Often the answer set contains data that is stored in more than one table. Where data is stored in more than one table a join plan is typically needed. In a relational database management system a cost based optimizer evaluates possible join plans. Some join plans may use Cartesian products of base tables or intermediate tables in the steps necessary to generate the answer set.

One difficulty is that the use of a Cartesian product table has the potential to result in a large amount of data. An intermediate table arising from a Cartesian product will generally include the product of the selected rows from each of the tables from which the intermediate table is generated. As an example, if one table results in ten selected rows, a second table has 100 selected rows and a third table has 1000 selected rows, the intermediate table generated from a Cartesian product of the three tables will have 1,000,000 rows.

Large intermediate tables require a large amount of random access memory (RAM) and/or secondary storage such as disk space. Large tables also result in more data needing to be transferred over the communications bus and therefore have the potential to reduce performance.

SUMMARY

Described below are techniques for executing a join plan that creates an intermediate table from two or more database. At least one projected and compressible column is identified within one of the database tables, the column containing data values to which the application of a compression data transformation results in a reduction in the size of the data values. The frequency of occurrences of at least some unique values is then identified in the compressible column. Two or more database tables are then joined. The results of the join are stored in the intermediate table such that the compression data transformation is applied to at least some of the unique values in the compressible column for which the frequency has been identified.

The frequency of occurrences is obtained from a value-count join index, a count of all the unique values in the column, the identification of a predetermined quantity of unique values in the column, or some other suitable technique. The predetermined quantity is typically less than the maximum number of unique values within the column.

DETAILED DESCRIPTION OF DRAWINGS

Figure 1:
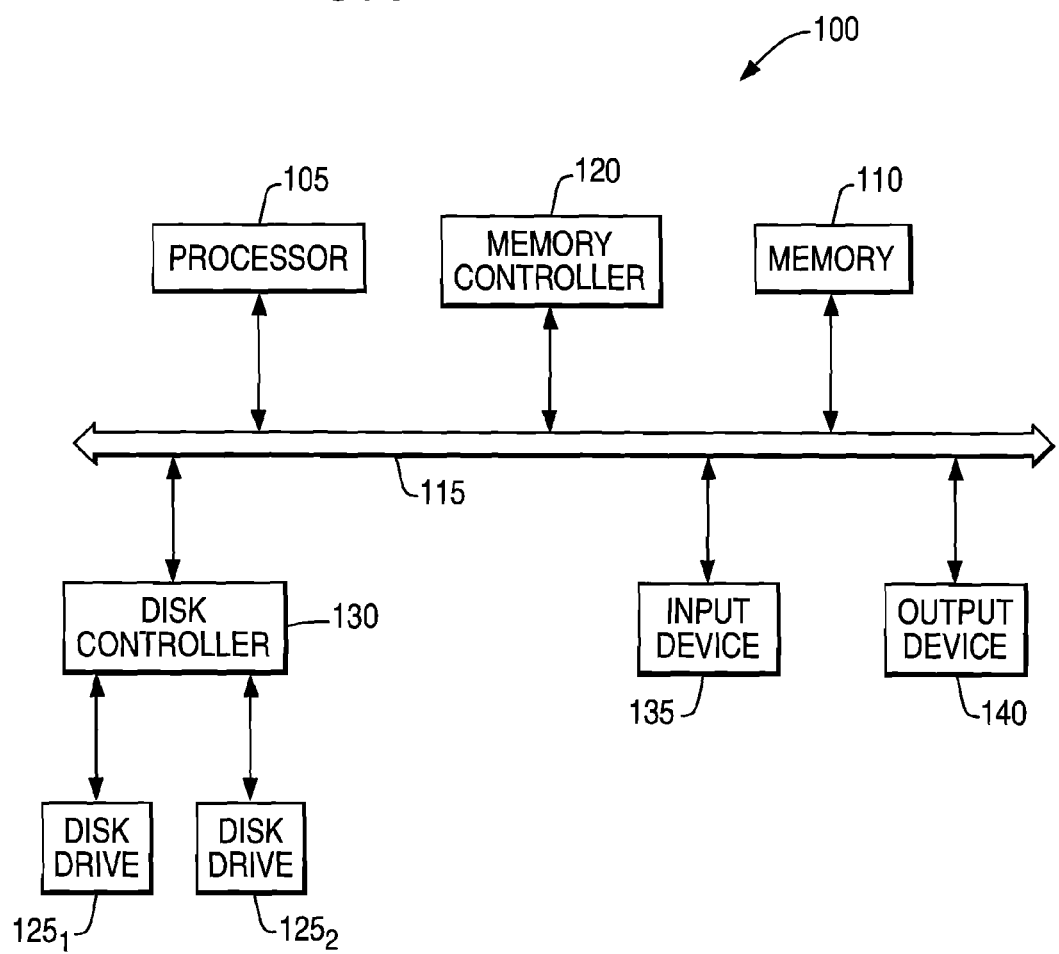
FIG. 1 is a block diagram of a computer system in which the techniques described below are implemented.

FIG. 1 shows a computer system 100 suitable for implementation of a method of using value list data compression to reduce the size of intermediate Cartesian product tables. The system 100 includes one or more processors 105 that receive data and program instructions from a temporary data storage device, such as a memory device 110, over a communications bus 115. A memory controller 120 governs the flow of data into and out of the memory device 110. The system 100 also includes one or more persistent data storage devices, such as disk drives 125$_1$ and 125$_2$ that store chunks of data or data objects in a manner prescribed by one or more disk controllers 130. One or more input devices 135, such as a mouse and a keyboard, and output devices 140, such as a monitor and a printer, allow the computer system to interact with a human user and with other computers.

The disk controller 130 receives requests from the memory controller 120 to store data objects on the disk drives 125 and to retrieve data objects from the disk drives. Repeated requests for data to be transferred to or from the disk drives has the potential to create a bottleneck at the disk drive or between the disk drives 125 and the disk controller(s) 130. This is particularly noticeable when there is a large amount of data stored in the disk drives 125 arising from intermediate result sets from user queries. Such a bottleneck can affect performance of the computer system due to the delay in transmitting or transferring such data objects between the disk drives and the disk controller for subsequent transfer over the communications bus 115. The maintaining of such large data sets also has potential implications for the amount of memory 110 required and the cache memory requirements of the system 100.

The techniques described below involve applying compressibility analysis techniques to data tables and deforming an intermediate table to hold the output from a Cartesian product of two tables. This has the potential to reduce the amount of storage memory required by the system and has the potential to reduce the amount of bandwidth required for the transfer of data.

Figure 2:
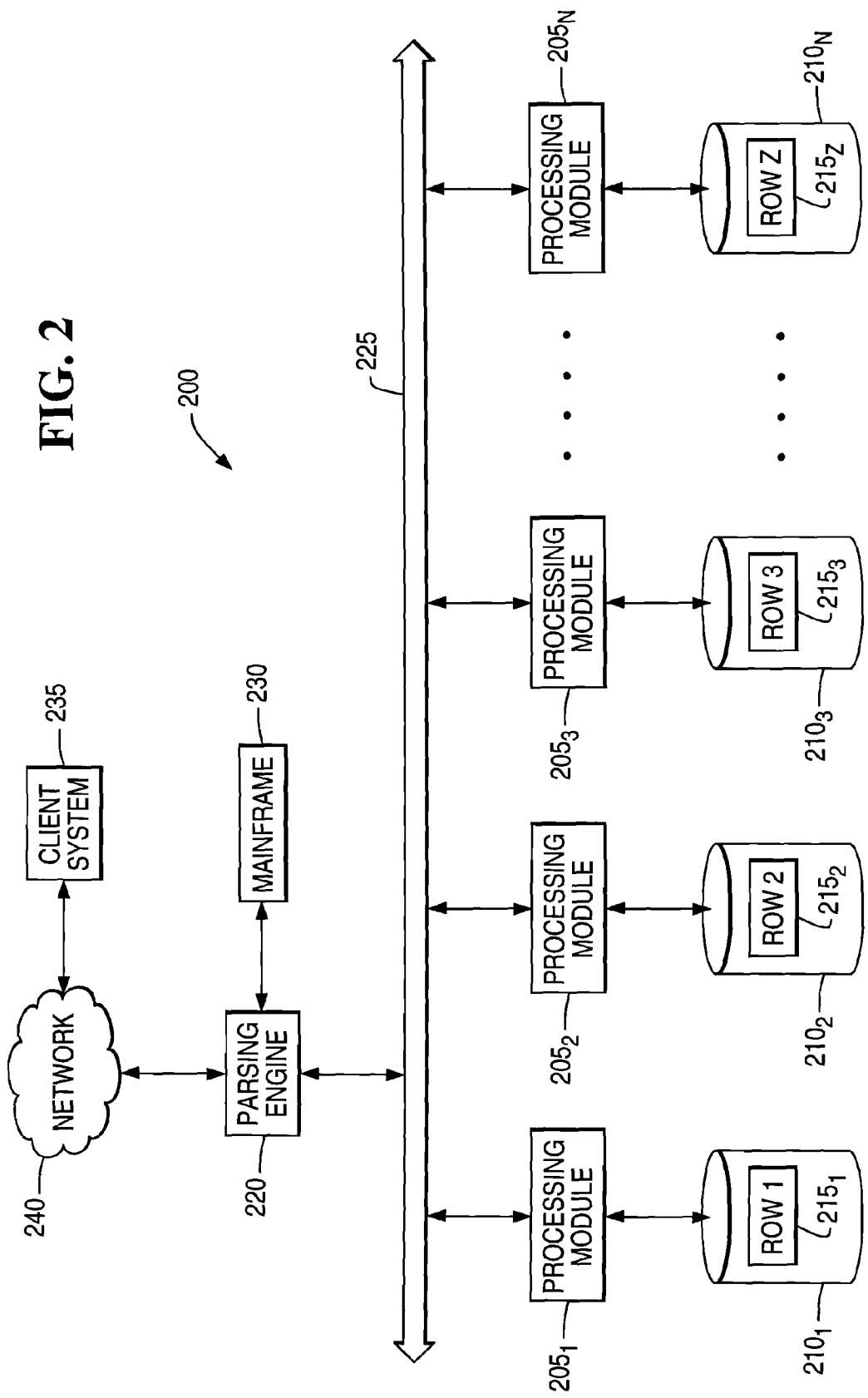
FIG. 2 is a block diagram of an exemplary large computer system in which the techniques described below are implemented.

While FIG. 1 shows a sample computer system, FIG. 2 shows an example of a database system 200, such as a Teradata Active Data Warehousing System available from NCR Corporation, in which the techniques described below are particularly suited for implementation. Database 200 is an example of one type of computer system in which the techniques described below are implemented. In computer system 200, vast amounts of data are stored on many disk-storage facilities that are managed by many processing units. In this example the data warehouse 200 includes a Relational Database Management System (RDBMS) built upon a Massively Parallel Processing (MPP) platform.

Other types of database systems, such as Object-Relational Database Management Systems (ORDMS) or those built on Symmetric Multi-Processing (SMP) platforms, are also suited for use here.

The database 200 includes one or more processing modules $205_{1 \ldots N}$ that manage the storage and retrieval of data and data storage facilities $210_{1 \ldots N}$. Each of the processing modules $205_{1 \ldots N}$ manages a portion of a database that is stored in a corresponding one of the data storage facilities $210_{1 \ldots N}$. Each of the data storage facilities $2101_{1 \ldots N}$ includes one or more disk drives.

The system stores data in one or more tables in the data storage facilities $210_{1 \ldots N}$. The rows $215_{1 \ldots N}$ of the tables are stored across multiple data storage facilities $210_{1 \ldots N}$ to ensure that the system workload is distributed evenly across the processing modules $205_{1 \ldots N}$. A parsing engine 220 organizes the storage of data and the distribution of table rows $215_{1 \ldots Z}$ among the processing modules $205_{1 \ldots N}$. The parsing engine 220 also co-ordinates the retrieval of data from the data storage facilities $210_{1 \ldots N}$ over network 225 in response to queries received from a user at a mainframe 230 or a client computer 235 connected to a network 240. The database system 200 usually receives queries and commands to build tables in a standard format, such as SQL.

Figure 3:
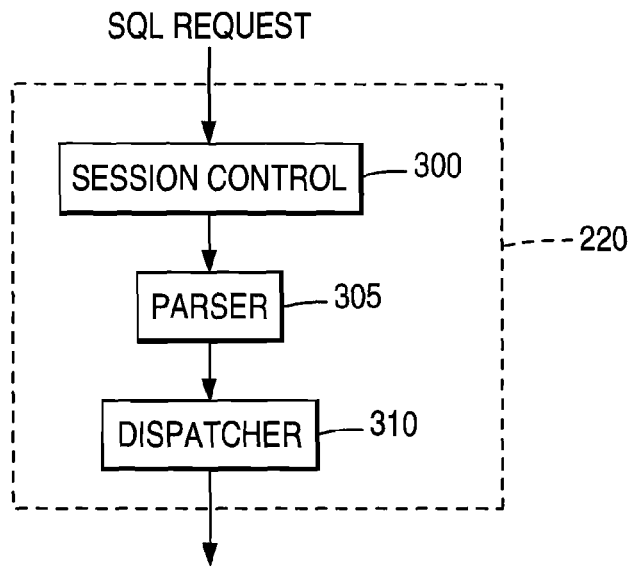
FIG. 3 is a block diagram of the parsing engine of the computer system of FIG. 2.

In one example system, the parsing engine 220 is made up of three components namely a session control 300, a parser 305, and a dispatcher 310 as shown in FIG. 3. The session control 300 provides a log on and log off function. It accepts a request for authorization to access the database, verifies it, and then either allows or disallows the access.

Figure 4:
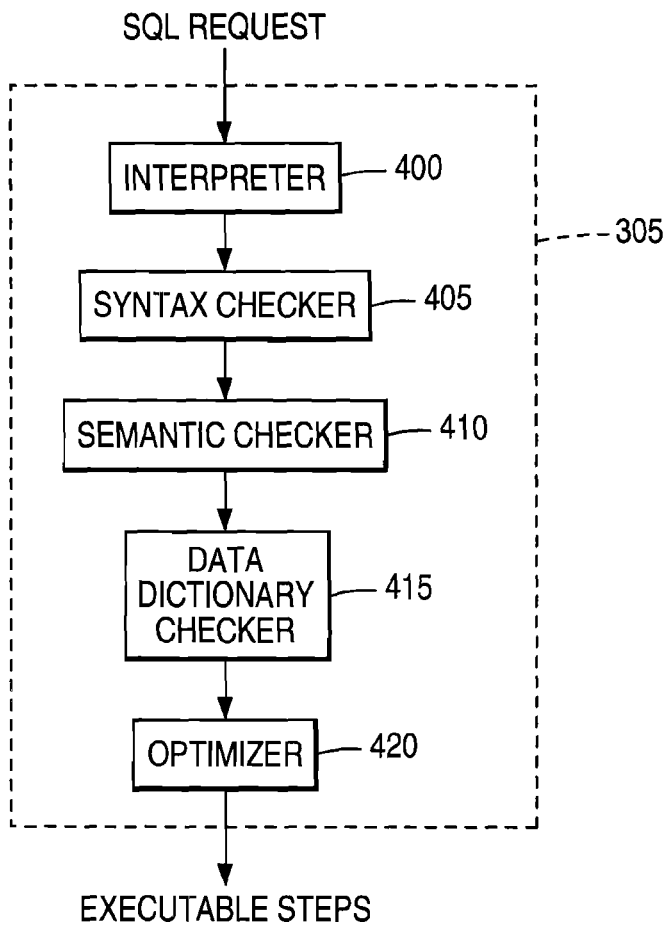
FIG. 4 is a flow chart of the parser of FIG. 3.

Once the session control 300 allows a session to begin, a user may submit an SQL request, which is routed to the parser 305. As illustrated in FIG. 4, the parser 305 interprets the SQL request (block 400), checks it for proper SQL syntax (block 405), evaluates it semantically (block 410), and consults a data dictionary to ensure that all of the objects specified in the SQL request actually exist and the user has the authority to perform the request (block 415). Finally, the parser 305 runs an optimizer (block 420) that develops the least expensive plan to perform the request.

The optimizer has access to statistics on one or more of the tables stored on data storage facilities 210. The statistics typically include min, max, mean, mode, median and range statistics. Many user queries require access to data from more than one table. Where the data for more than one table is required there is generally a choice as to the order in which such tables are combined and rows that do not satisfy the query are discarded. The optimizer evaluates possible join plans using the stored statistics. Such join plans often use Cartesian products of base tables or intermediate tables in the steps necessary to generate the answer set.

Figure 5:
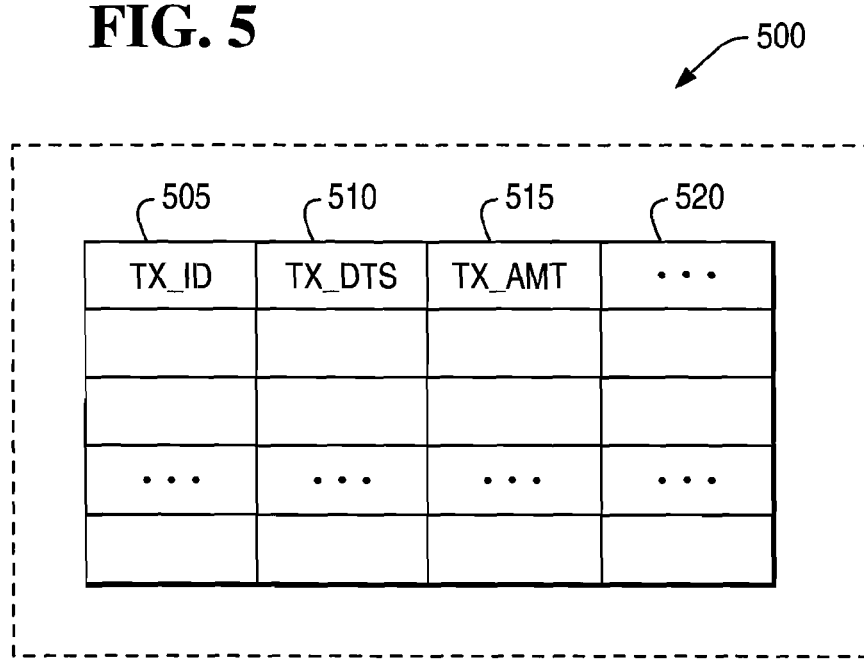
FIG. 5 is a typical table to which the techniques described below are suited.

FIG. 5 illustrates a typical table 500 forming part of what is a popular schema to which the techniques described below are well suited for implementation. Database table 500 is an example of transaction data. Transaction data typically records transactional events that are routine in the life of a business such as retail purchases by customers, call-detail records, bank deposits, bank withdrawals and insurance claims. Table 500 includes a transaction identifier (TX_ID, column 505), a transaction date-time stamp indicating when a particular transaction took place (TX_DTS, column 510) and the value or amount of the transaction (TX_AMT, column 515). The table 500 could include further columns 520.

The number of rows in a transaction table such as table 500 in a typical organization is likely to be very large. The number of rows, each row representing a different transaction, could be many millions or billions.

Figure 6:
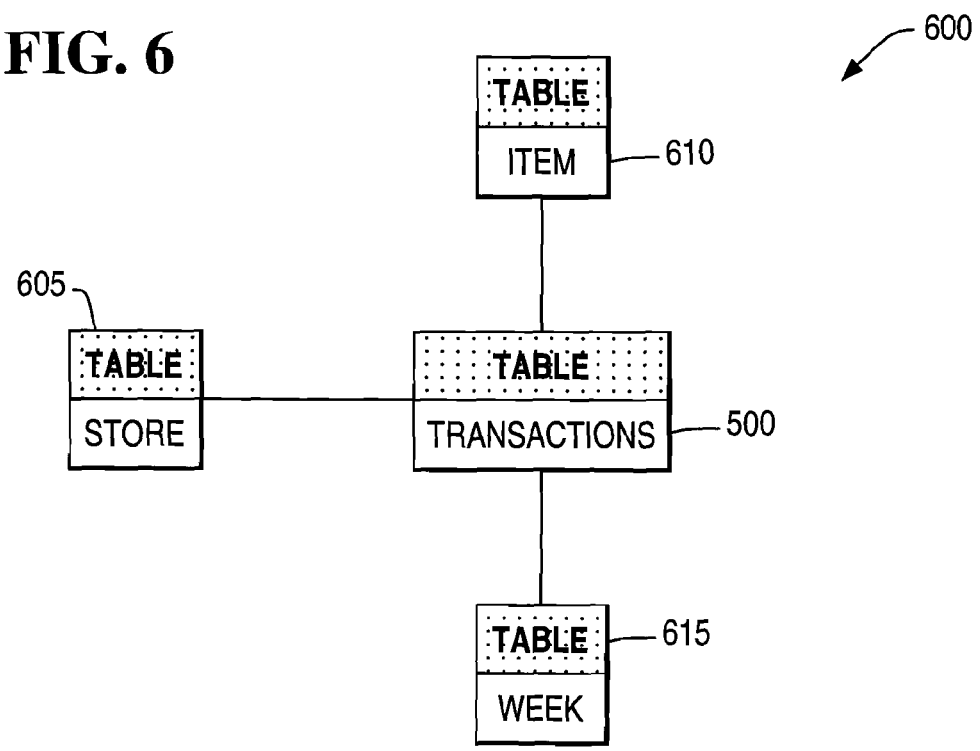
FIG. 6 is a database schema to which the techniques described below are suited.

FIG. 6 shows an entity relationship diagram of a typical schema 600 involving table 500. Table 500 is an example of a large fact table. It is related as shown to a store table 605, an item table 610 and a week table 615. The store table 605, the item table 610 and the week table 615 are examples of dimension tables that are typically smaller than the fact table 500. For a given query, the optimizer may evaluate many plans, but the general class of plans frequently chosen for a schema such as schema 600 is the class of "star join" plans, in which the small dimension tables 605, 610 and 615 are joined with a Cartesian product prior to be joined to the larger fact table 500.

Depending on the selectivity of the query predicates, the number of rows selected from small tables 605, 610 and 615, in this example could be i for table 605, j for table 610 and k for table 615. The cardinality of the Cartesian product (C) of tables 605, 610 and 615 is calculated by:

$$C = i \times j \times k \qquad (1)$$

Each table join includes one or more projected columns. A projected column is a column of interest selected from the columns of the two tables to be joined. For each projected column in the first dimension table 605, the field value in each row will occur $j \times k$ times in the resulting intermediate spool table where j is the number of rows selected from table 610 and k is the number of rows selected from table 615. Similarly, for each projected column in the second small dimension table 615, the field value in each row will occur $i \times k$ times in the intermediate spool table, where i is the number of rows selected from table 605 and k is the number of rows selected from table 615. For each projected column in the third small dimension table 615, the field value in each row will occur $i \times j$ times in the intermediate spool table, where i is the number of rows selected from table 605 and j is the number of rows selected from table 610. The Cartesian product can be calculated for any number of such dimension tables.

Figure 7:
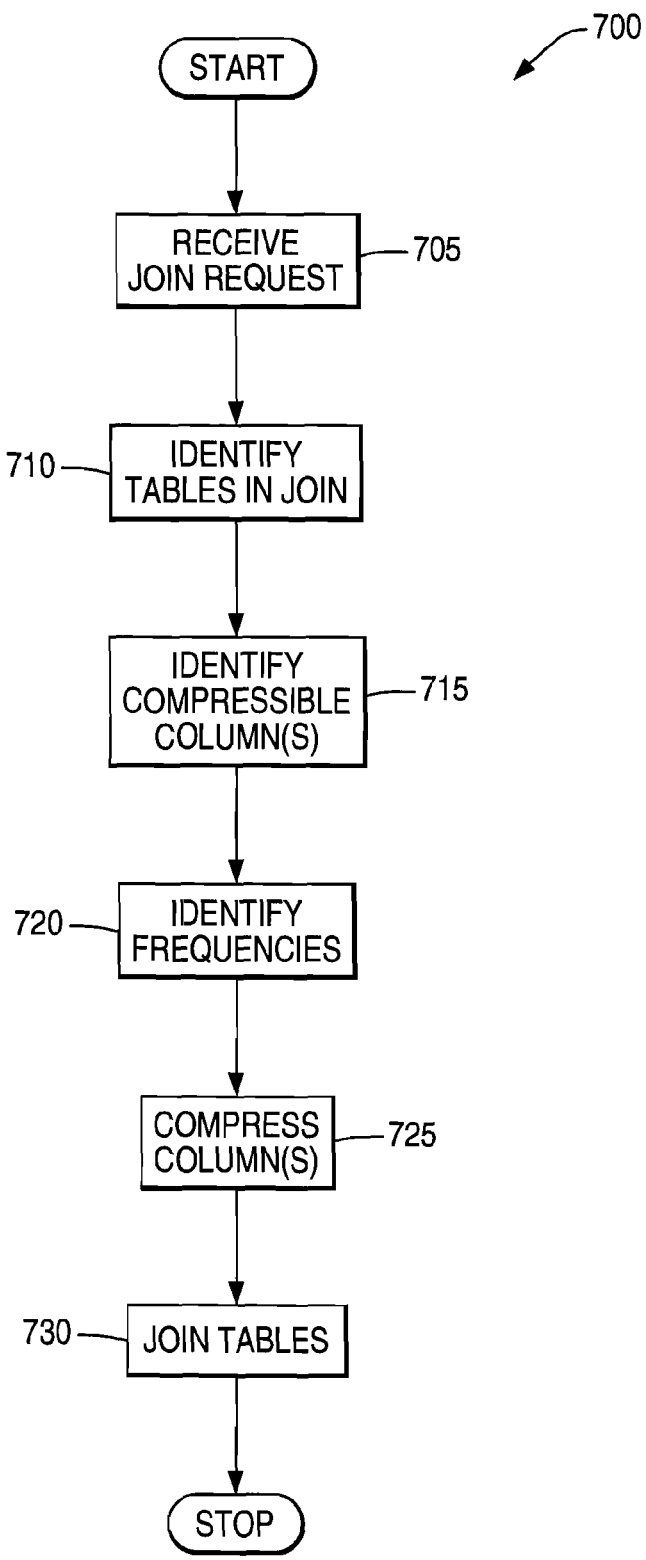
FIG. 7 is a flow chart of the execution of a join plan using the techniques described below.

The technique described below executes a join plan that creates an intermediate table from two or more database tables within a database. FIG. 7 illustrates a flow chart of the execution of a join plan using data compression. The first step in the technique 700 is to receive 705 a join request. The next step is to identify 710 the tables involved in a Cartesian product forming part of the join that generates an intermediate table. Not all of the columns of each of the tables need be projected onto the intermediate table. Those columns that are not projected onto the intermediate table are ignored in this technique.

Of the columns that are projected onto the intermediate table, many of these columns will have data values that are able to be compressed to some extent. The technique identifies 715 compressible columns within the database tables. Compressible columns are columns that contain data values to which the application of a compression data transformation results in a reduction in the size of the data values. A typical data compression data transformation includes value list compression. Each unique value to be compressed is assigned a value between 1 and z−1 inclusive, where z is a power of 2. The value of z determines the number of presence bits required to represent the unique values. The actual or look up values themselves are stored in a copy of the table header on each data-storage device on which the table is stored. A value of 0 means that the value is not compressed. This is referred to as a non-compressed indicator pattern.

The next step is to identify 720 the frequencies of occurrences of at least some of the unique values in the compressible columns identified in step 715 above. This is also known as performing a value count analysis of the unique values. The resulting data is then ordered by count.

There are several methods for identifying the frequency of these occurrences. The first is a precise count which involves examining a value-count join index on the compressible column. The value-count join index is a precise and complete demographic of the count of each value in a column. The value-count index is typically automatically maintained by the system and is always current.

Another technique for identifying frequencies is to scan the entire table and generate a value-count demographic of the values in the column. The value-count demographic will typically include pairs of datum in which each unique value in the column is paired with the number of times that unique value occurs within the column. The pairs are typically ordered by count so that the most frequently occurring value is at the head of a resulting list and the least frequently occurring unique value is at the other end of the list.

Where value list compression is the compression algorithm selected, one technique includes a step of identifying the maximum number (M) of unique values within the compressible column that is able to be compressed. In one example described below for example one of the compressible columns has a data type size of 4 bytes and the maximum number M of unique values able to be compressed is 255.

Another form of the technique includes the step of identifying a value N representing a number of unique values. The value N is typically predetermined. The technique scans or samples the column until N unique values have been found. N is typically a preset or predetermined number and is less than or equal to the maximum number (M) of unique values able to be compressed within the compressible column.

In another form of the technique the number of data values in the compressible column is identified. A predetermined percentage (P) of those data values is scanned. As with the technique described above up to N unique numbers are located.

The result of the identification of frequencies is either an exact count or an estimation of the most frequently occurring values within the compressible column.

The next step is to define 725 the compression required. The compressible column is compressed by applying a compression data transformation to at least some of the unique values for which the frequency has been identified in step 720 above. Compression characteristics, such as the compression data transformation and/or the columns of the intermediate table to which the compression will be applied, are typically specified or defined at the time of creation of the empty intermediate table. This information is stored in the DDL of the newly created intermediate table. There are alternative techniques for determining how many of the unique values need to be compressed. The data compression is typically applied to the most frequently occurring unique values.

One technique further includes the step of identifying a maximum number (M) of unique values within the compressible column that are able to be compressed and then the compression algorithm is applied to those M most frequently occurring values.

In another technique an optimal number (N) of unique values is identified and those N unique values are compressed. This value of N is calculated as the most efficient number from the data demographics generated on the table and the data type.

The tables are then joined 730 and the output rows stored in the intermediate table. Any fields matching columns to be compressed from the DDL are stored in a compressed format following application of the specified compression data transformation to the data.

The resulting intermediate table is potentially smaller in size than it would have been in the absence of the techniques described here.

Figure 8:
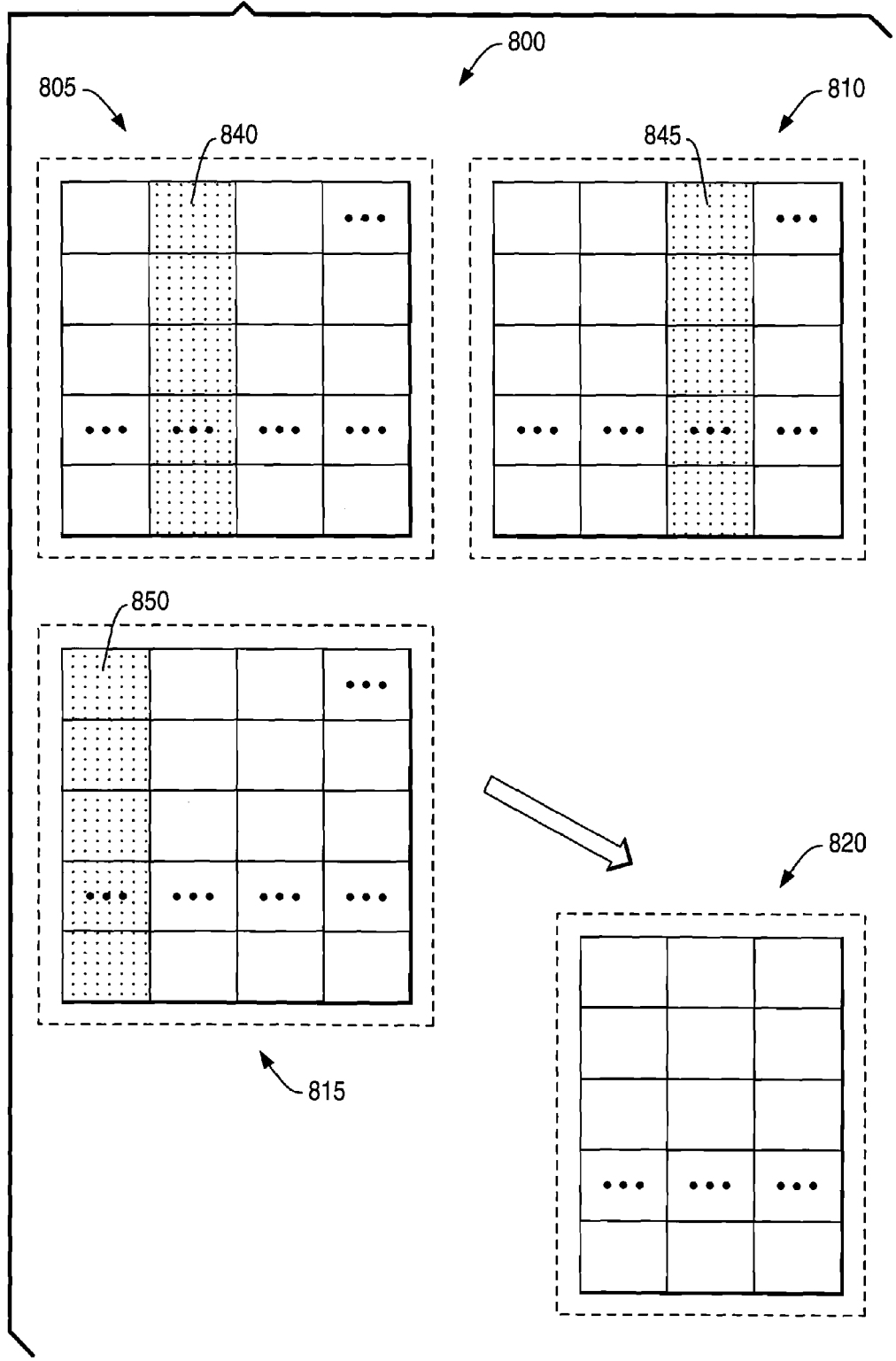
FIG. 8 shows examples of three tables and the application of the techniques described below to these tables.

FIG. 8 shows 800 an example of application of the techniques described above to three dimension tables. These dimension tables are indicated at 805, 810 and 815 respectively. These dimension tables 805, 810 and 815 could correspond to the database schema shown in FIG. 6 of store table 605, item table 610 and week table 615 respectively.

The tables shown in FIG. 8 are to be joined with a Cartesian product. In this example 10 rows are selected from table 805, one hundred rows are selected from table 810, and one thousand rows are selected from table 815. The intermediate Cartesian product 820 of tables 805, 810 and 815 will have one million rows.

It is assumed for this example that only one compressible column is projected from each of dimension tables 805, 810 and 815. These compressible columns are indicated at 840, 845 and 850 respectively. It is also assumed that each of the columns has a data type size of 4 bytes (32 bits). It is also assumed that up to 255 values are able to be compressed per column and that the worst case exists in which all of the values are unique in each column.

The expected size of the intermediate Cartesian product table 820 is calculated as follows:

$$\text{data size} = \text{number of rows} \times \text{number of columns} \times \text{column size} \quad (2)$$

$$= 1,000,000 \times 3 \times 32$$

$$= 96,000,000 \text{ bits}$$

The compression techniques described above have the potential to reduce the data size of intermediate table 820 significantly.

Projected column 840 from table 805 is able to be 100% compressed. There are a maximum of 10 selected rows and in the worst case scenario each row will have a unique value. Therefore there are at most 10 values. The number of bits required to represent 10 values is 4. Four bits are able to represent up to 15 values plus the non-compressed indicator pattern as $2^4=16$. Therefore each row in column 840 only requires 4 bits rather than 32 bits. This results in a significant compression of 87.5% for column 840.

The data storage requirements for compressed column 840 are calculated as follows:

$$\text{data size} = 1,000,000 \times 4 = 4,000,000 \text{ bits} \quad (3)$$

Projected column 845 from table 810 is also able to be 100% compressed. There are 100 selected rows in column 845 so there are at most 100 unique values. Up to 127 unique values plus the non-compressed indicator pattern can be represented using 7 bits as $2^7$ is 128. Therefore each row only requires 7 bits instead of 32 bits. The data size is calculated as follows:

$$\text{data size} = 1,000,000 \times 7 = 7,000,000 \quad (4)$$

As an alternative to compressing all of the bits in column 845, the technique could instead calculate the optimal number of bits to compress. If there are up to 100 unique values, the technique may instead only compress 64 values. Six bits are required to represent 63 values and the non-compressed indicator pattern as $2^6$ is 64. The data storage requirements for this partially compressed column is calculated as follows:

$$\text{data size} = (640{,}000 \times 6) + (360{,}000 \times 32) = 15{,}360{,}000 \qquad (5)$$

In the above case it is more efficient to compress all of the values in column 845 using 7 presence bits shown in (4) rather than compress partially shown in (5). If column 845 had a data type size of 1 byte (8 bits) rather than 4 bytes (32 bits) then the optimal compression would have favored partial compression rather than full compression.

There are 1,000 selected rows in column 850 of table 815. There are up to 1,000 unique values in column 850 however in this example a maximum of 255 values may be compressed per column. The first 255 values of the 1,000 values will require 8 bits as $2^8$ is 256 and we require one pattern to indicate non-compressibility leaving 255 unique values that can be compressed. The remaining 745 non compressed values will each require 32 bits. The data size is calculated by:

$$\text{data size} = (255{,}000 \times 8) + (745{,}000 \times 32) = 25{,}880{,}000 \qquad (6)$$

Using the results calculated from equations (3), (4) and (6), the total size of the partially compressed table is:

$$\text{data size} = 4{,}000{,}000 + 7{,}000{,}000 + 25{,}880{,}000 = 36{,}880{,}000 \qquad (7)$$

The size calculated in (7) is considerably less than the uncompressed size calculated in (2).

In the example above it was assumed the worst case in which all of the values were unique in each column. In a further example the values in the projected columns have what is referred to as a Zipfian data demographic and the cardinalities of the selected rows in the three tables are 25, 274 and 2499 respectively. A Zipfian distribution is one where the frequency of the value occurrence is inversely proportional to the rank order of the value. In a Zipfian distribution the second value occurs half as often as the first value and the third value occurs one third as often as the first value and so on.

The expected size of the intermediate Cartesian product table 820 in this example is calculated as follows:

$$\begin{aligned}
\text{data size} &= \text{number of rows} \times \text{number of columns} \times \text{column size} \\
&= (25 \times 274 \times 2499) \times 3 \times 32 \text{ bytes} \\
&= 17{,}118{,}150 \times 3 \times 32 \text{ bytes} \\
&= 205{,}417{,}800 \text{ bytes}
\end{aligned} \qquad (8)$$

In table 805, the value frequencies are 12, 6, 4, 3. Examining table 805 in isolation, we calculate that the data storage requirements for uncompressed column 840 are calculated as follows:

$$\text{data size} = 25 \times 4 = 100 \text{ bytes} \qquad (9)$$

Examining table 805 in isolation, we calculate that single value compression requires approximately 55 bytes, two value compression requires approximately 34 bytes, three value compression requires approximately 18 bytes and four value compression requires approximately 9 bytes. In this example compressing four values is optimal and requires 3 presence bits as $2^3=8$.

Projected column 845 from table 810 has value frequencies of 120, 60, 40, 30, 24.

The data storage requirements for uncompressed column 845 are calculated as follows:

$$\text{data size} = 274 \times 4 = 1{,}096 \text{ bytes} \qquad (10)$$

Single value compression requires just under 651 bytes. Three value compression requires just under 285 bytes and five value compression requires approximately 103 bytes. Compressing five values is optimal and requires 3 presence bits as $2^3=8$.

Projected column 850 from table 815 has value frequencies of 1020, 510, 340, 255, 204, 170. Compressing six values is optimal and requires 3 presence bits as $2^3=8$.

The Cartesian product following compression requires only 9 presence bits (3 bits for each projected column) to represent the values from the 3 projected columns. This requires a total of 19,257,919 bytes to store the 3 projected columns. This can be compared with the uncompressed intermediate product that requires 205,417,800 bytes. In this example the compression techniques have achieved a tenfold reduction in the size of the intermediate Cartesian product.

The techniques described above arise from the observation that a Cartesian product of two relational tables creates redundancy. The techniques described above apply value list compression to reduce the size of intermediate Cartesian product tables. This reduction in size has the potential to increase the efficiency and/or reduce the cost of certain join plans.

The text above describes one or more specific embodiments of a broader invention. The invention also is carried out in a variety of alternative embodiments and thus is not limited to those described here. Those other embodiments are also within the scope of the following claims.

We claim:

1. A method of executing a join plan that creates an intermediate table from two or more database tables within a database, the method comprising:
    identifying, by a processing module of a computer system, at least one projected and compressible column within one of the database tables to be joined by the join plan, the column containing data values to which the application of a compression data transformation results in a reduction in the size of the data values, wherein the database tables are stored on at least one data storage facility;
    identifying, by the processing module, a frequency of occurrences of at least some unique values in the compressible column;
    joining, by the processing module, the two or more database tables; and
    storing, by the processing module, results of the join in the intermediate table such that the compression data transformation is applied to at least some of the unique values in the compressible column for which the frequency has been identified.

2. The method of claim 1 wherein the step of identifying the frequency of occurrences further comprises the steps of maintaining a value-count join index on the table and identifying the frequency of occurrences from the value-count join index.

3. The method of claim 1 wherein the step of identifying the frequency of occurrences further comprises the steps of:
    identifying all unique values in the compressible column; and
    counting the frequency of each unique value in the compressible column.

4. The method of claim 1 wherein the step of identifying the frequency of occurrences further comprises the steps of:
   identifying up to a predetermined quantity of unique values in the compressible column, where the predetermined quantity of unique values in the compressible column is less than a total number of unique values in the compressible column; and
   counting the frequency of the predetermined quantity of unique values in the compressible column.

5. The method of column 4, further comprising the steps of: identifying a maximum number of unique values within the compressible column able to be compressed;
   selecting a value for such that the predetermined quantity of unique values in the compressible column is less than or equal to the maximum number of unique values within the compressible column able to be compressed.

6. The method of claim 1 wherein the step of identifying the frequency of occurrences further comprises the steps of:
   identifying the number of data values in the compressible column;
   identifying a predetermined quantity of unique values within up to a predetermined percentage of the number of data values in the compressible column.

7. The method of column 6, further comprising the steps of: identifying the maximum number of unique values within the compressible column able to be compressed;
   selecting a value for the predetermined quantity of unique values in the compressible column such that the predetermined quantity of unique values in the compressible column is less than or equal to the maximum number of unique values within the compressible column able to be compressed.

8. The method of claim 1 wherein the compression data transformation is applied to the most frequently occurring unique values.

9. The method of claim 8 further comprising the steps of:
   identifying the maximum number of unique values within the compressible column able to be compressed; and
   applying the compression data transformation to the most frequently occurring unique values of the maximum number of unique values within the compressible column able to be compressed.

10. The method of claim 8 further comprising the steps of: identifying an optimal number of unique values within the compressible column to be compressed; and
    applying the compression data transformation to the most frequently occurring unique values of the optimal number of unique values within the compressible column.

11. A system for executing a join plan that creates an intermediate table from two or more database tables within a database, where the system is configured to:
    identify, by a processing module, at least one projected and compressible column within one of the database tables, the column containing data values to which the application of a compression data transformation results in a reduction in the size of the data values;
    identify, by the processing module, the frequency of occurrences of at least some unique values in the compressible column;
    join, by the processing module, the two or more database tables; and
    store, by the processing module, the results of the join in the intermediate table such that the compression data transformation is applied to at least some of the unique values in the compressible column for which the frequency has been identified.

12. A computer program stored on tangible storage media comprising executable instructions for performing a method of executing a join plan that creates an intermediate table
    from two or more database tables within a database, the method comprising:
    identifying at least one projected and compressible column within one of the database tables, the column containing data values to which the application of a compression data transformation results in a reduction in the size of the data values;
    identifying the frequency of occurrences of at least some unique values in the compressible column;
    joining the two or more database tables; and
    storing the results of the join in the intermediate table such that the compression data transformation is applied to at least some of the unique values in the compressible column for which the frequency has been identified.

* * * * *